United States Patent [19]

Sheldon

[11] 4,344,653
[45] Aug. 17, 1982

[54] WHEEL TRIM DEVICE

[75] Inventor: Leonard W. Sheldon, Rochester, Mich.

[73] Assignee: Rockwell International Corporation, Pittsburgh, Pa.

[21] Appl. No.: 157,021

[22] Filed: Jun. 6, 1980

[51] Int. Cl.³ .................. B60B 7/00; B21D 53/26
[52] U.S. Cl. .................................. 301/37 T; 24/288;
    24/293; 24/295; 29/159 A; 29/453; 428/31
[58] Field of Search ............... 428/31, 121, 122;
    301/37 R, 37 T, 37 B, 108 R, 37 CD, 108 A, 37
    PB, 37 L; 24/73 HC, 73 SB, 73 SM, 73 SS, 288,
    293, 295, 334, 347, 371; 113/116 E; 29/159 A,
    453; 403/361, 329

[56] References Cited

U.S. PATENT DOCUMENTS

| 2,268,132 | 12/1941 | Candellero | 301/108 R |
| 3,606,433 | 9/1971 | Kunevicius | 428/31 X |
| 3,860,294 | 1/1975 | Jacobs | 301/37 R |
| 3,923,295 | 12/1975 | Leitner | 301/108 R X |
| 4,171,149 | 10/1979 | Marks et al. | 301/37 R X |

Primary Examiner—William A. Powell
Assistant Examiner—Thomas Bokan

[57] ABSTRACT

An ornamental wheel device includes a sheet metal ring portion having an annular wall and inwardly turned first and second flanges to define open channels at the extremities thereof. A plurality of clips are circumferentially spaced around the annular wall and include extended toothed members adapted for biting engagement of the wheel. The ends of each clip are furcated so that a space is provided between the forks at each end for receipt of the flanges therein to secure the clip to the ring portion.

12 Claims, 5 Drawing Figures

U.S. Patent
Aug. 17, 1982
4,344,653
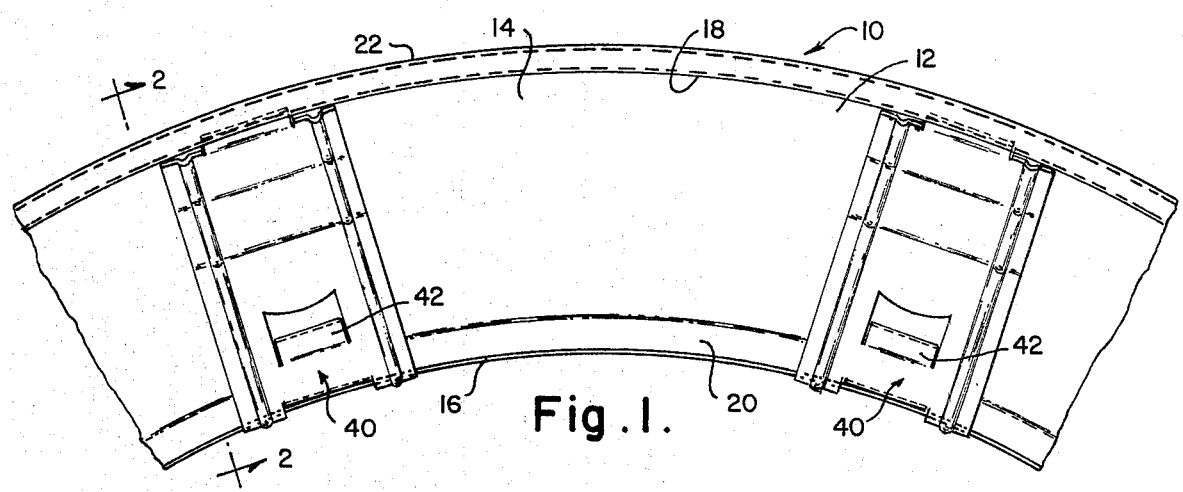
Fig. 1.
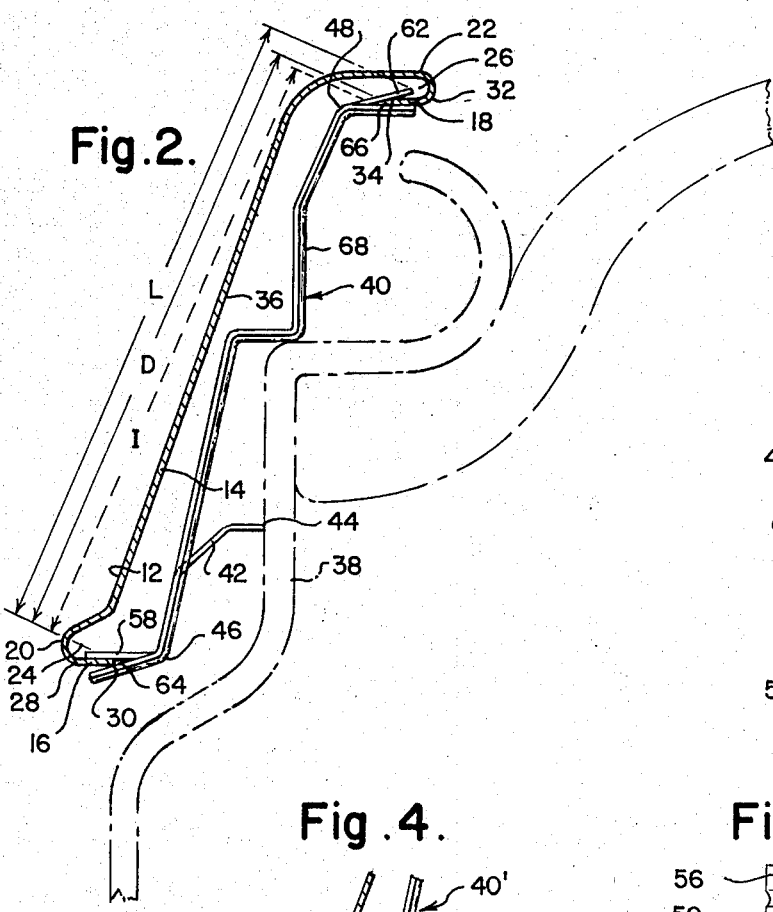
Fig. 2.
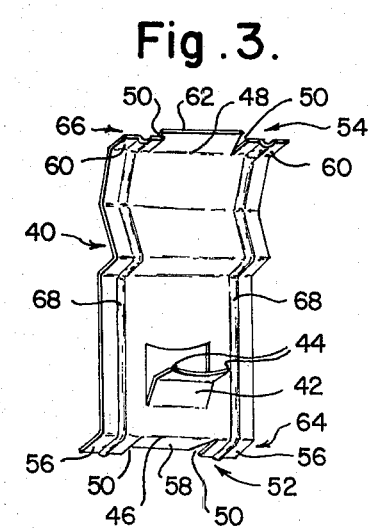
Fig. 3.
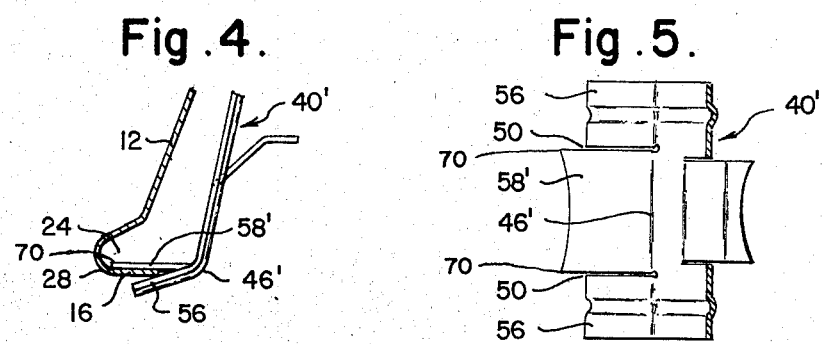
Fig. 4.
Fig. 5.

WHEEL TRIM DEVICE

BACKGROUND OF THE INVENTION

1. Field of the Invention

This invention relates to an ornamental wheel device and more specifically to such a wheel device which includes an ring portion having a plurality of clips circumferentially spaced around one side thereof including extended toothed members adapted for biting engagement of the wheel.

2. Description of the Prior Art

Ornamental wheel covers and wheel trim rings have long been used in motor vehicles to decorate the wheels. It is essential that these wheel devices be designed to be removably secured to the wheel while having reliable retention means which prevent its accidental removal under environmental extremities and during substantial vibration throughout operation of the wheel. It is also desirable to produce the wheel devices as inexpensively as possible and to insure that the manufacturing process does not interfere with the aesthetic design of the wheel device.

Some early embodiments of these wheel covers and trim rings included a backing ring which extended around the entire circumference of the wheel device. The backing ring included a number of biting members which made biting contact with the wheel to retain the wheel device thereon. These devices required a number of manufacturing steps to produce and a significant amount of material.

An improved wheel trim device as disclosed in U.S. Pat. No. 3,757,400 includes integral means for providing the biting members but, again, requires a significant number of manufacturing steps including crimping the extended end of the backing clips to the ornamental ring portion. This introduces the liklihood of some marring or damaging of the ornamental surface of the trim device.

U.S. Pat. Nos. 3,860,294 and 3,999,268 disclose still another improvement which utilize separate clips which are dispersed circumferentially around the wheel device. However, the design also requires some crimping at the peripheral edges of the ring portion which might interfere with the aesthetic appearance of the wheel device as the clips are captured within the flanges by crimping. Similarly, U.S. Pat. No. 4,171,149 also discloses a plurality of clips which are secured to a wheel device. Although one end of the clip is secured by another means, the design still appears to require that the other end of the clip be crimped to the periphery of the ring portion.

Accordingly, each of these patents requires some crimping steps to insure that the clips are properly retained within the ring portion of the wheel device and this additional operation has the added disadvantage of potentially causing damage to the ornamental surface of the wheel device.

SUMMARY OF THE INVENTION

It is, therefore, an object of this invention to provide an ornamental wheel device which is inexpensive to produce and can be reliably retained on the wheel during vehicle operation.

It is a further object of this invention to provide such an ornamental wheel device utilizing a minimum number of manufacturing steps while reducing the liklihood of any damage to the ornamental surface of the wheel device.

These and other objects of the invention will become apparent from the preferred embodiment of the invention which includes an ornamental wheel device for a wheel having a ring portion which includes an annular wall and inwardly turned first and second flange means respectively at first and second radial extremities of the ring portion to define open channels between the flange means and the annular wall adjacent thereto. Each flange means has a base joined to the annular wall at the extremity and extends inwardly to terminate at an edge thereof. The flange means and the channels are disposed at an outer side of the annular wall to be adjacent to the wheel when the ornamental wheel device is installed on the wheel. A plurality of clips are circumferentially spaced around the outer side of the annular wall with each of the clips having an extended toothed member adapted for biting engagement of the wheel. Each clip has a first end which makes engaging contact with the ring portion at the first extremity thereof and a second end which is furcated to include a space between the fork means thereof. The second flange means is then received within the space to secure the clip to the ring portion.

BRIEF DESCRIPTION OF THE DRAWINGS

FIG. 1 is a partial side elevational view of the wheel device of the present invention.

FIG. 2 is a sectional view taken along line 2—2 of FIG. 1 including a typical wheel configuration shown in phantom.

FIG. 3 is a perspective view of the preferred clip of the present invention.

FIG. 4 is a partial view of an alternative embodiment of the invention as generally shown in FIG. 2.

FIG. 5 is a top view of the alternative clip of FIG. 4.

DETAILED DESCRIPTION OF THE PREFERRED EMBODIMENT

As seen in FIGS. 1, 2 and 3, the preferred ornamental wheel device 10 includes a trim ring 12 which is formed of sheet metal and includes an annular wall 14 and inwardly turned first and second flanges 16, 18. The first flange 16 and the second flange 18 are respectively at a first radial extremity 20 and a second radial extremity 22 of the trim ring 12 to define open channels 24 and 26 between the flanges 16, 18 and the annular wall 14 adjacent thereto.

Although the preferred wheel device 10 is a trim device which does not extend across the center portion of the wheel, it should be apparent to those skilled in the art that the invention as taught herein could be utilized in the formation of any number of wheel device designs. For example, the trim ring 12 might only be a ring portion of a wheel cover with additional ornamental sheet metal, spokes etc. extending across the center of the wheel and being joined to the ring portion. It would also be possible, for example, to form a wheel cover device out of a single piece of sheet metal. The ring portion could be defined by punching the flange means out of the sheet metal at circumferentially separated locations around the outer edge of the wheel cover. In other words, the trim ring 12 of the preferred embodiment might alternatively be a ring portion of a different type of ornamental wheel cover without departing from the invention as claimed. Additionally, where the flanges 16 and 18 in the preferred embodiment are formed to extend around the entire circumference of the ring 12, they might alternatively be discrete flange means which are formed at separate locations around a ring portion of an ornamental wheel device.

Returning to the preferred wheel device 10, it can be seen that the flange 16 has a base 28 which is integrally joined to the annular wall 14 at the extremity 20 and extends inwardly to terminate at an edge 30 thereof. Similarly, the flange 18 has a base 32 which is integrally joined to the annular wall 14 at the extremity 22 and extends inwardly to terminate at an edge 34 thereof. The flanges and channels are disposed at an outer side 36 of the annular wall 14 to be adjacent the wheel 38 (shown in phantom in FIG. 2) when the wheel device 10 is installed on the wheel.

To insure retention of the wheel device 10 on the wheel, a plurality of clips 40 are circumferentially spaced around the outer side 36 of the annular wall 14 with each of the clips 40 having an extended toothed member 42 adapted for biting engagement of the wheel 38.

As best seen in FIG. 3, each clip 40 is formed of sheet metal and the toothed member 42 is preferably punched from the surface of the clip 40 and stamped and formed to include gripping points 44 which extend in a cantilevered fashion to grip the wheel 38. Alternatively, the toothed member 42 might be formed of different metal and otherwise joined to the clip 40. The clip 40 has a first end 46 and a second end 48 which are respectively associated with the first flange 16 and the second flange 18 when the clip is installed on the trim ring 12.

In the preferred clip 40, it will be seen that both the first end 46 and the second end 48 are similarly formed in the preferred wheel trim device 10. However, as will become apparent hereinbelow, it would be possible to alter either end of the clip or only one end of the clip while still falling within the scope of the present invention which includes a unique and simple way for retaining the clip on the trim ring 12. Each end 46, 48 is furcated by a pair of longitudinal slits 50 being formed in the sheet metal to define fork means 52, 54 respectively at the ends 46, 48. By bending the sheet metal at different angles, the end 46 of the clip 40 includes a pair of outer fork members 56 and a larger central fork member 58. Similarly, the end 48 is bent to include a pair of outer fork members 60 with a larger central fork member 62. As a result, the end 46 includes a space 64 between the fork members 56, 58 while the end 48 includes a space 66 between the fork members 60, 62.

As will be seen later, it is desirable to provide rigidity to the clip 40. This has been accomplished in the preferred clip 40 by including longitudinally extending ribs 68 during the formation of the clip 40 which extend from the fork members 56 to the fork members 60.

Returning to FIG. 2, it can be seen that the preferred clip 40 is different from the prior art devices mentioned hereinabove in that it includes a means for gripping the flanges 16, 18 of the trim ring 12 rather than simply being inserted in a channel formed by the flanges. Specifically, during installation, the first end 46 of the clip 40 is directed toward the flange 16 as the edge 30 thereof is inserted into the space 64. To install the second end 48 of the clip 40 at the flange 18, pressure is applied to the trim ring 12 near the extremity 22 and to the second end 48 of the clip 40 to force them into closer association. The large fork member 62 will slide along the outer surface of the flange 18 until it reaches the edge 34 thereof. A slight additional movement of the end 48 will cause the flange 18 to be located within the space 66 and fully seated therein when the force applied at the extremity 22 and end 48 is released. As a result, the second end 48 of the clip 40 is retained on the flange 18 to secure both ends of the clip 40 to the ornamental trim ring 12. It has been found that the clips 40 can be installed in this manner by hand quickly and with no damage to the ornamental surface of the trim ring. It is expected that a machine might be employed for installation of the clips and still not damage the ornamental surface since the installing force would not be nearly as great as a crimping force.

It should be noted that it is not necessary for both ends of the clip to be identical for the clip to be properly retained in the trim ring. For example, it is only essential that a first end of the clip make some sort of engaging contact with the trim ring 12 at a first extremity thereof for the retention feature of the second end to properly secure the clip to the trim ring.

To further explain this feature, it can be seen in FIG. 2 that when the clip is fully installed, there can be determined to exist a distance D from the location of engaging contact with the first end of the clip 40 to the edge 34 of the second flange 18. Meanwhile, the clip 40 is provided a predetermined length L from the location of engaging contact with the trim ring at the first end 46 to the extended end of the second end 48 (which in this orientation would be to the end of the fork member 62). By designing the length L to be greater than the distance D, the clip 40 will be retained adjacent the trim ring 12 when the edge 34 of the flange 18 is received within the space 66. Viewed in this manner, it should be apparent that either flange 16 or flange 18 might be oriented differently from that shown in the preferred embodiment and either the first end 46 or the second end 48 might be provided a different configuration to match the orientation. In any case, the design should include the proper relationship of the predetermined distance D and the predetermined length L which will insure the desired retention of the clip relative to the trim ring by the capture of one of the edges of one of the flanges within the space provided at the end of the clip.

Although, as described above, proper dimensions can be provided to generally retain the clip at the outer side 36 to the trim ring. It is also desirable to insure against any relative movement, including circumferential movement, which might dislocate the clip relative to the trim ring and thus interfere with retention on the wheel. Accordingly, in any embodiment or configuration of the invention as described hereinabove, it would be desirable to have it particularly adapted to insure that at least one of the ends of the clip 40 will make sufficient gripping contact with its respective flange to prevent this relative movement. As previously mentioned, the preferred clip 40 is formed of relatively rigid sheet metal but the trim ring 12 is preferably formed of sheet metal which includes some spring-like qualities. As a result, the trim ring 12 is in a stressed condition when the clip 40 is installed thereon as shown in FIG. 2. In an unstressed condition, the trim ring 12 includes an initial distance I between the location of engaging contact with the first end 46 and the edge 34 of the second flange 18 which is less than the predetermined distance D. Accordingly, when the clip 40 is properly installed, the trim ring 12 is resiliently elongated and under tension when the second flange 18 is received within the space 66 to further insure its retention within the space 66. Additionally, by forming the clip 40 of sheet metal and by forming the longitudinal slits 50 in the second end 48 thereof, the fork members 60, 62 are provided relatively sharp longitudinal edges adjacent the slits 50. These edges make gripping contact with the second flange 18 because of the tensile force applied to the flange 18 by the trim ring 12 being in a stressed condition.

As seen in FIG. 4, the first end of the preferred clip 40 has been slightly altered to provide an alternative embodiment which will further demonstrate the versatility of the retention feature of the present invention. The first end 46' of the alternative clip 40' is again furcated in a manner similar to the preferred embodiment. However, the central fork member 58' is in this alternative extended to include toothed means 70 which are dimensioned to make gripping contact with the base 28 of the flange 16 when the first end 46' is installed thereon. While this embodiment thus provides a different location for the primary engaging contact of the first end of the clip with the trim ring from that of the preferred embodiment discussed hereinabove, the same basic relationships between the distance D and the length L would still exist. It might, in fact, even be possible to eliminate the pair of fork members 56 since a significant portion of the first end 46' is now fully received within the channel 24 as it makes contact with the base 28 of the flange 16. It should be noted that the retention of the first end 46' of the clip 40' is accomplished without the necessity of any crimping of the trim ring 12 at the flange 16 when the lengths and dimensions described hereinabove are maintained.

Accordingly, it can be seen that any of the embodiments of the invention and the various alternatives thereto described hereinabove could be included in a wheel device without departing from the scope of the invention as claimed.

I claim:

1. An ornamental wheel device for a wheel comprising:
    a ring portion being preformed of resilient sheet metal to include an annular wall and inwardly turned first and second flange means respectively at first and second radial extremities of said ring portion to define open channels between said flange means and said annular wall adjacent thereto;
    each said flange means having a base joined to said annular wall at said extremity and extending inwardly to terminate at an edge thereof;
    said flange means and said channels being disposed of a first side of said annular wall to be adjacent said wheel when said ornamental wheel device is installed on said wheel;
    a plurality of clips circumferentially spaced around said first side of said annular wall with each of said clips having an extending toothed member thereon adapted for biting engagement of said wheel;
    each said clip having a first end which is making engaging contact with said ring portion at said first extremity thereof and a second end which is frucated to include a space between the fork means thereof; and
    said second flange means being received within said space to cause said ring portion to be resiliently elongated and under tension to secure said clip to said ring portion and insure its retention thereon throughout engagement and disengagement of said wheel.

2. The ornamental wheel device as set forth in claim 1, wherein said clip is formed of sheet metal and said fork means are formed by a pair of longitudinal slits in said second end with said sheet metal between said slits being a center fork means and being at a different angle from said sheet metal outwardly of said slits which form a pair of outer fork means to provide said space between said center fork means and said pair of outer fork means.

3. The ornamental wheel device as set forth in claim 2, wherein said clip is reinforced by longitudinal rib means being formed in said sheet metal thereof with said rib means extending from said first end to said second end.

4. The ornamental wheel device as set forth in claim 3, wherein said tension of said ring portion causes said second flange to apply a force to said fork means and said fork means has longitudinal edges adjacent said slits which make gripping contact with said second flange means under said force to prevent said clip from sliding circumferentially relative to said ring portion.

5. The ornamental wheel device as set forth in claim 1, wherein said engaging contact by said first end with said ring portion at said first extremity thereof is caused by said first end being furcated to include a space between the fork means thereof as said first flange means is received within said space.

6. The ornamental wheel device as set forth in claim 1, wherein said engaging contact by said first end with said ring portion at said first extremity thereof is caused by a portion of said first end extending into said channel at said first extremity to make contact with said base of said first flange means.

7. An ornamental wheel device for a wheel comprising:
    a ring portion being preformed of resilient sheet metal to include an annular wall and inwardly turned first and second flange means respectively at first and second radial extremities of said ring portion to define open channels between said flange means and said annular wall adjacent thereof;
    each said flange means having a base joined to said annular wall at said extremity and extending inwardly to terminate at an edge thereof;
    said flange means and said channels being disposed at a first side of said annular wall to be adjacent said wheel when said ornamental wheel device is installed on said wheel;
    a plurality of clips circumferentially spaced around said first side of said annular wall with each of said clips having an extending toothed member thereon adapted for biting engagement of said wheel;
    each said clip having a first end which is making engaging contact with said ring portion at a first extremity thereof and a second end which is frucated to include a space between the fork means thereof;
    said second flange means being received within said space to secure said clip to said ring portion for retention thereon throughout engagement and disengagement of said wheel;
    said ring portion having a predetermined distance between the location of said engaging contact with said first end of said clip and said edge of said second flange means when said clip is secured thereto;
    said clip having a predetermined length from said location of said engaging contact with said ring portion to an extended end of said fork means located within said channel of said second flange means;

said predetermined length being greater than said predetermined distance;

said ring portion in an unstressed condition having an initial distance between said location of said engaging contact and said edge of said second flange means prior to securing said clip therein which is less than said predetermined distance;

said clip being relatively rigid when compared with said ring portion; and said ring portion being resiliently elongated and under tension when said second flange means is received within space and said clip is secured to said ring portion to insure said retention of said clip thereon throughout said engagement and said disengagement of said wheel.

8. The ornamental wheel device as set forth in claim 7, wherein said clip is formed of sheet metal and said fork means are formed by a pair of longitudinal slits in said second end with said sheet metal between said slits being a center fork means and being bent at a different angle from said sheet metal outwardly of said slits which form a pair of outer fork means to provide said space between said center fork means and said pair of outer fork means.

9. The ornamental wheel device as set forth in claim 7 wherein said clip is reinforced by longitudinal rib means being formed in said sheet metal thereof with said rib means extending from said first end to said second end.

10. The ornamental wheel device as set forth in claim 9, wherein said tension of said ring portion causes said second flange to apply a force to said fork means and said fork means has longitudinal edges adjacent said slits which make gripping contact with said second flange means under said force to prevent said clip from sliding circumferentially relative to said ring portion.

11. The ornamental wheel device as set forth in claim 7, wherein said engaging contact by said first end with said ring portion at said first extremity thereof is caused by said first end being frucated to include a space between the fork means thereof as said first flange means is received within said space.

12. The ornamental wheel device as set forth in claim 7, wherein said engaging contact by said first end with said ring portion at said first extremity thereof is caused by a portion of said first end extending into said channel at said first extremity to make contact with said base of said first flange means.

* * * * *